(12) United States Patent
Shinkawa

(10) Patent No.: US 8,067,868 B2
(45) Date of Patent: Nov. 29, 2011

(54) STATOR STRUCTURE OF OUTER ROTOR MULTIPOLAR GENERATOR

(75) Inventor: Yasuhiro Shinkawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 273 days.

(21) Appl. No.: 12/575,746

(22) Filed: Oct. 8, 2009

(65) Prior Publication Data

US 2010/0096939 A1 Apr. 22, 2010

(30) Foreign Application Priority Data

Oct. 20, 2008 (JP) ................................. 2008-270121

(51) Int. Cl.
*H02K 3/52* (2006.01)
*H01R 39/00* (2006.01)
(52) U.S. Cl. ............ 310/71; 310/194; 439/174; 439/890
(58) Field of Classification Search .................... 310/71, 310/91, 194, 260, 270; 439/174, 276, 890
See application file for complete search history.

(56) References Cited

U.S. PATENT DOCUMENTS

| | | | | |
|---|---|---|---|---|
| 4,481,435 A | * | 11/1984 | Loforese | 310/71 |
| 6,030,260 A | * | 2/2000 | Kikuchi et al. | 439/890 |
| 6,137,198 A | * | 10/2000 | Kawamura | 310/71 |
| 6,333,579 B1 | * | 12/2001 | Hirano et al. | 310/194 |
| 7,345,398 B2 | * | 3/2008 | Purvines et al. | 310/216.137 |
| 7,492,067 B2 | * | 2/2009 | Kotajima | 310/71 |
| 7,692,356 B2 | * | 4/2010 | Bott et al. | 310/260 |

FOREIGN PATENT DOCUMENTS

| | | |
|---|---|---|
| JP | 11-150906 A | 6/1999 |
| JP | 2000-295808 A | 10/2000 |

* cited by examiner

*Primary Examiner* — Tran Nguyen
(74) *Attorney, Agent, or Firm* — Westerman, Hattori, Daniels & Adrian, LLP

(57) ABSTRACT

In a stator structure 1 of an outer rotor generator, a pressing portion 33 provided on a first portion 31 of a connecting terminal 30 is configured to protrude inward in the radial direction of an annular coupler 20 when the connecting terminal 30 is attached to the coupler 20. The coupler 20 is formed with a circular cylindrical guide protrusion 23, and an outlet of a stator winding 5 having wound on a salient pole 10b is configured to be guided by the guide protrusion 23, bent inward in the radial direction and reach the pressing portion 33. After fusing processing, the first portion 31 on which the pressing portion 33 is provided is bent at a right angle toward a side opposed to a side with which the stator winding 5 is connected, and then a distal end thereof is locked at a lock portion 26.

5 Claims, 15 Drawing Sheets

STATOR STRUCTURE OF OUTER ROTOR MULTIPOLAR GENERATOR

TECHNICAL FIELD

The present invention relates to a stator structure of an outer rotor multipolar generator, and in particular, a stator structure of an outer rotor multipolar generator configured such that a winding end is connected to a connecting terminal by fusing processing.

BACKGROUND ART

It has conventionally been known that a fusing (thermal caulking) technique by application of electric power and pressure is used as a method for connecting an end of an armature winding to a connecting terminal in order to connect the armature winding wound on a stator core of a magneto generator to an external wiring. Such a fused processed portion is desired not to be subjected to vibrations of an engine that drives the generator, etc.

Patent Literature 1 discloses a stator structure of an outer rotor magneto generator configured such that an end of a connecting terminal connected with an armature winding is bent along a flat surface portion of a stator core after fusing processing. According to this configuration, the end of the connecting terminal does not protrude to the flat surface portion side of the stator, whereupon the influence of vibrations can be reduced.

Further, Patent Literature 2 discloses an outer rotor magneto generator wherein an end of a winding that extends from a salient pole of a stator core is configured to be connected to a connecting terminal by once being drawn toward the back side of the stator core through a gap with an adjacent salient pole and then striding over one salient pole at the back side and once again being drawn toward the front side of the stator core. According to this configuration, slack at the winding end can be avoided, and the influence of vibrations can be reduced.

CITATION LIST

Patent Literature

Patent Literature 1: Japanese Published Unexamined Patent Application No. H11-150906
Patent Literature 2: Japanese Published Unexamined Patent Application No. 2000-295808

SUMMARY OF INVENTION

Technical Problem

In the technique as described in Patent Literature 1, however, insufficient operation of pulling the winding end inserted through the connecting terminal and removing slack before the fusing processing would raise a disadvantage that the slack remains in the winding even after an end of the connecting terminal is bent.

Further, in the technique as described in Patent Literature 2, a winding length from an end-of-winding portion toward the stator core to the connection with the connecting terminal is increased, thereby raising a likelihood of causing new slack. Further, an irregular winding manner at the time of finishing winding of the winding is required, and accordingly there is a problem that the winding operation is complicated.

Moreover, a structure performing both the prevention of slack at the winding end and the reduction of bending stress caused at the bent portion of the winding end is not disclosed or suggested in the aforementioned Patent Literatures.

Accordingly, an object of the present invention is to solve the foregoing problems of the prior art and to provide a stator structure of an outer rotor multipolar generator capable of improving assemblability of the stator structure and resistance to vibrations at a fused processed portion and also facilitating automation of operations.

Solution to Problem

The present invention has a first feature in that a stator structure of an outer rotor multipolar generator including an annular stator core arranged with a salient pole at an outer circumference thereof and a winding by which the salient pole is wound via an insulating bobbin, the stator structure comprising: an annular coupler fixed at an inner circumference side of the stator core; and a connecting terminal for connecting the winding to an external wiring, wherein the annular coupler has an attaching portion for the connecting terminal and a guide protrusion adjoining an outer circumference side of the coupler relative to the attaching portion and guiding the winding to the connecting terminal; the connecting terminal has a pressing portion for connecting the winding to the connecting terminal by fusing processing; the connecting terminal is fixed at the attaching portion in such a manner that the pressing portion protrudes inward in a radial direction of the annular coupler; and an end of the winding drawn from the salient pole is configured to be guided at an outer circumferential surface of the guide protrusion, bent inward in the radial direction and then reach the pressing portion.

The present invention has a second feature in that one end of the connecting terminal formed with the pressing portion is configured to be bent, after the fusing processing, at a right angle approximately toward a side opposed to a side with which the winding is connected.

The present invention has a third feature in that the connecting terminal is a plate member composed of a first portion and a second portion, the first portion being configured to be provided with the pressing portion and the second portion being bent at a right angle approximately relative to the first portion; the first portion has a through hole for positioning at the time of attachment to the attaching portion of the annular coupler; and the annular coupler has a positioning protrusion engaged with the through hole of the first portion and a connecting terminal attaching hole into which the second portion is inserted.

The present invention has a fourth feature in that the annular coupler is composed of a plurality of components circumferentially divided, and each component has the same shape.

The present invention has a fifth feature in that the annular coupler has a lock portion on which a distal end of the one end of the connecting terminal is locked when the one end is bent after the fusing processing.

Advantageous Effects of Invention

The present invention has a first feature in that an annular coupler fixed at an inner circumference side of a stator core has an attaching portion for a connecting terminal and a guide protrusion adjoining an outer circumference side of the coupler relative to the attaching portion and guiding the winding to the connecting terminal; and an end of the winding drawn from the salient pole is configured to be guided at an outer circumferential surface of the guide protrusion, bent inward in the radial direction and then reach the pressing portion. Therefore, the bending stress caused on the bent portion can be reduced even in a state where the winding is under tension by, for example, making the guide protrusion be of a circular cylinder shape erected in a rotation axis direction of the generator and guiding the winding at the outer circumferential surface of the protrusion. As a result, reliability with respect to disconnection can significantly be increased.

Further, the present invention has a feature in that the connecting terminal is fixed at the attaching portion in such a manner that the pressing portion protrudes inward in a radial direction of the annular coupler. Therefore there is no obstacle in the vertical direction of the pressing portion, that is, the rotation axis direction of the generator. Thus, the fusing electrode and the coupler cannot be contacted with each other when the connecting terminal and the winding are connected by fusing processing. Consequently, the possibility that the coupler formed of resin, etc., is deformed by heat caused at the time of fusing processing is decreased, and the automation of fusing processing is facilitated.

The present invention has a second feature in that one end of the connecting terminal formed with the pressing portion is configured to be bent, after the fusing processing, at a right angle approximately toward a side opposed to a side with which the winding is connected. Therefore, the winding which is connected to the outside peak of the bent portion results in being stretched when the connecting terminal is bent, and any slack in the winding can be removed. Consequently, resistance to vibrations at the fused processed portion is increased and product reliability can be improved. Further, there is no need to apply tension to the end of the winding at the time of performing the fusing processing, and thus, the automation of fusing processing is facilitated. Further, the radially-inward protrusion of the connecting terminal is eliminated, and accordingly, workability at the time of attaching the stator core on the engine, etc., can be improved. In addition, a driving direction of a machine for bending the connecting terminal easily conforms to a driving direction of the fusing electrodes in fusing processing. Thus, successive performance of the fusing processing and the bending processing is facilitated without rotating about an axis of diameter of the stator core. By this, the automation of operations is further facilitated.

The present invention has a third feature in that the connecting terminal is a plate member composed of a first portion and a second portion, the first portion being configured to be provided with the pressing portion and the second portion being bent at a right angle approximately relative to the first portion; the first portion has a through hole for positioning at the time of attachment to the attaching portion of the annular coupler; and the annular coupler has a positioning protrusion engaged with the through hole of the first portion and a connecting terminal attaching hole into which the second portion is inserted. Therefore, the connecting terminal stays in a predetermined position by inserting the second portion of the connecting terminal into the connecting terminal attaching hole of the coupler, whereupon assembly operation of the connecting terminal is facilitated.

The present invention has a fourth feature in that the annular coupler is composed of a plurality of components circumferentially divided, and each component has the same shape. Therefore, compared with a case where an annular coupler is integrally formed, the attaching processing of the coupler to the stator core and the fusing processing can be performed separately, for example, and thus the level of freedom in assembly operation is increased. Further, the possibility of distortion in the coupler due to heat, etc., can be decreased.

The present invention has a fifth feature in that the annular coupler has a lock portion on which a distal end of the one end of the connecting terminal is locked when the one end is bent after the fusing processing. Therefore, the end of the connecting terminal having been bent is prevented from being moved by vibrations of the engine, etc., and resistance to vibrations can further be enhanced. In addition, the end of the connecting terminal does not catch the operator's hands when the stator core is attached to the engine, etc., whereby assemblability is improved.

BRIEF DESCRIPTION OF DRAWINGS

FIG. 10 is a side view of the connecting terminal.
FIG. 11 is a bottom view of the connecting terminal.

DESCRIPTION OF EMBODIMENTS

Figure 1:
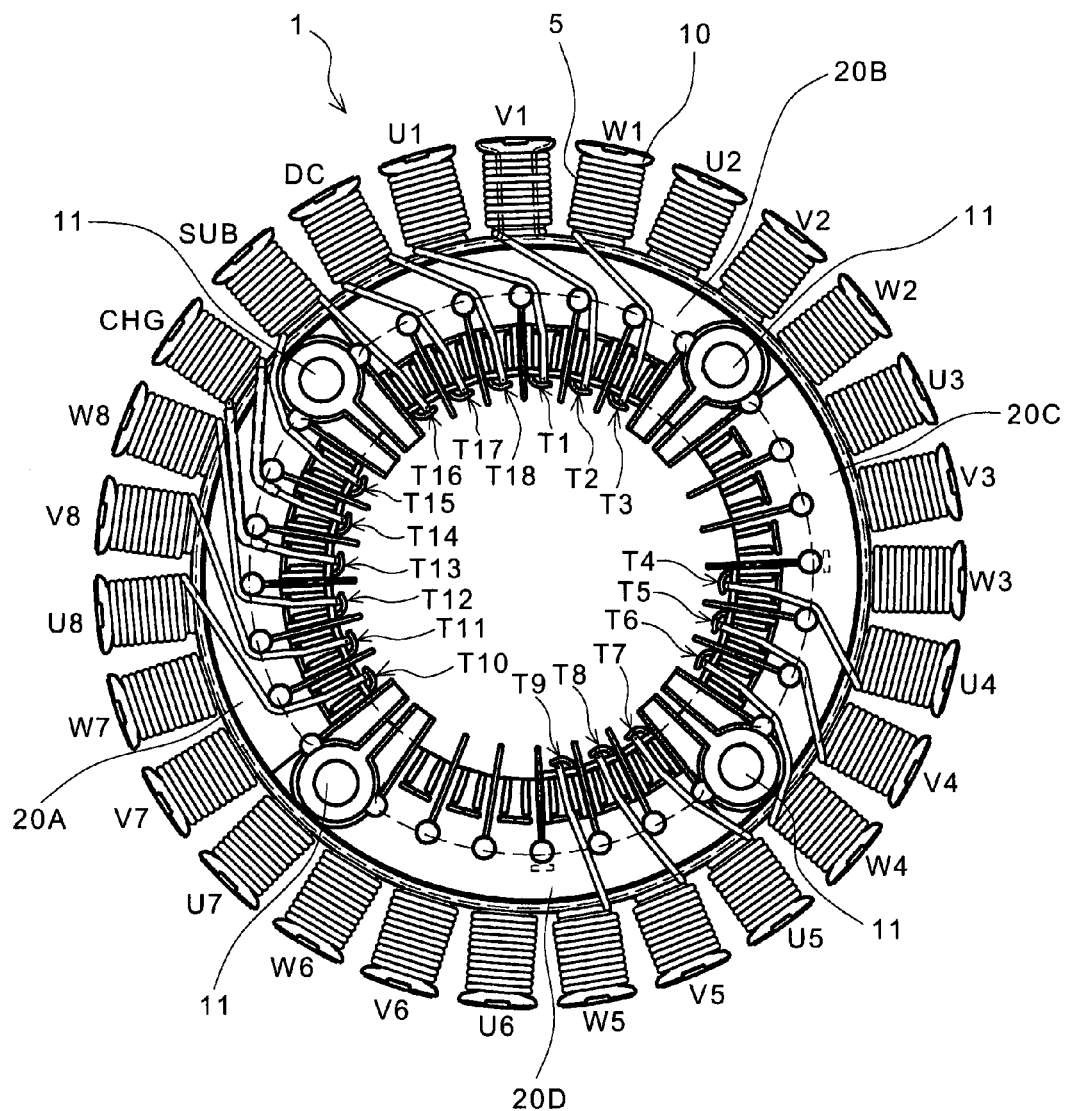
FIG. 1 is an elevational view of a stator structure according to an embodiment of the present invention.
Figure 2:
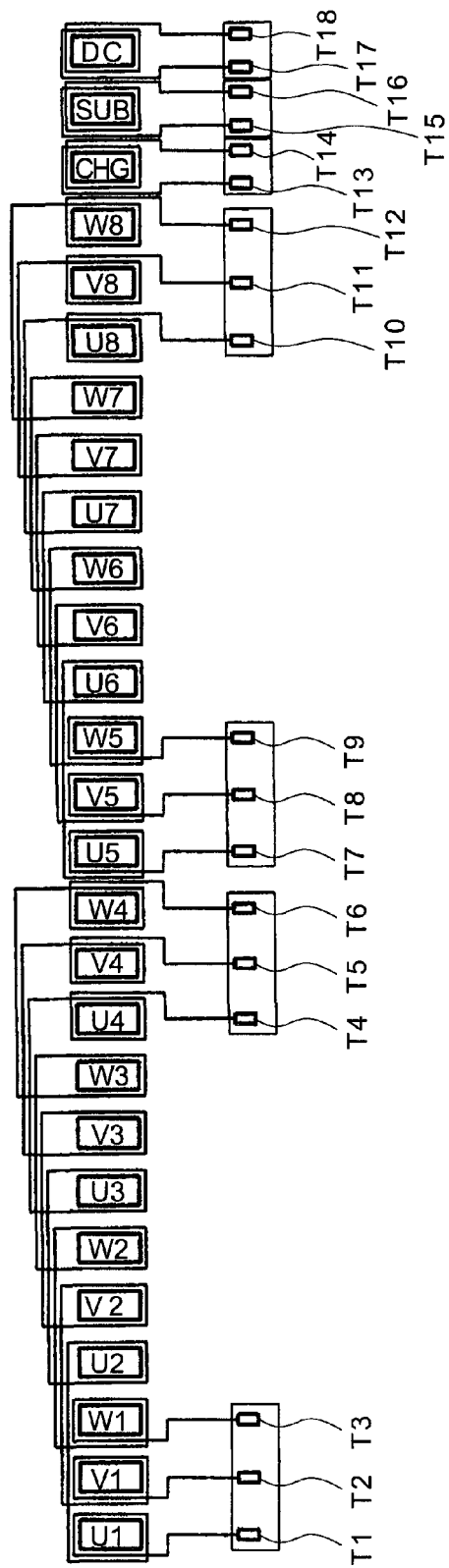
FIG. 2 is a development view of a stator core.
Figure 3:
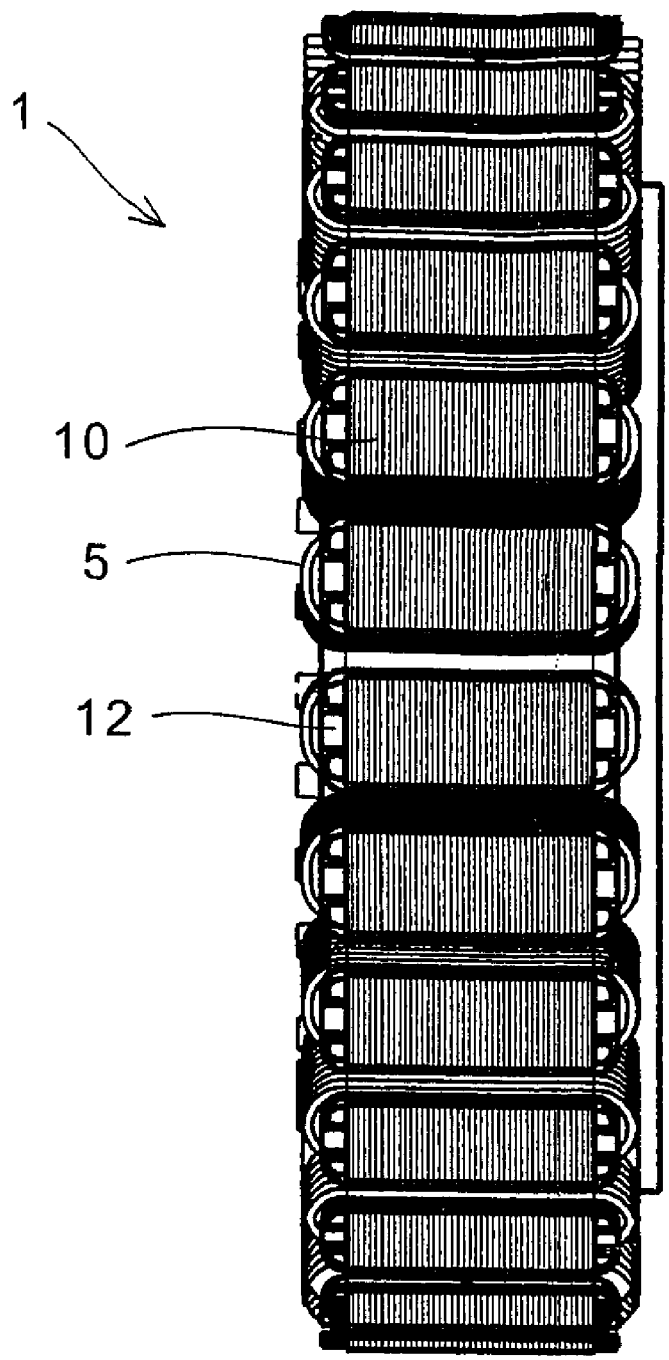
FIG. 3 is a side view of the stator structure.
Figure 4:
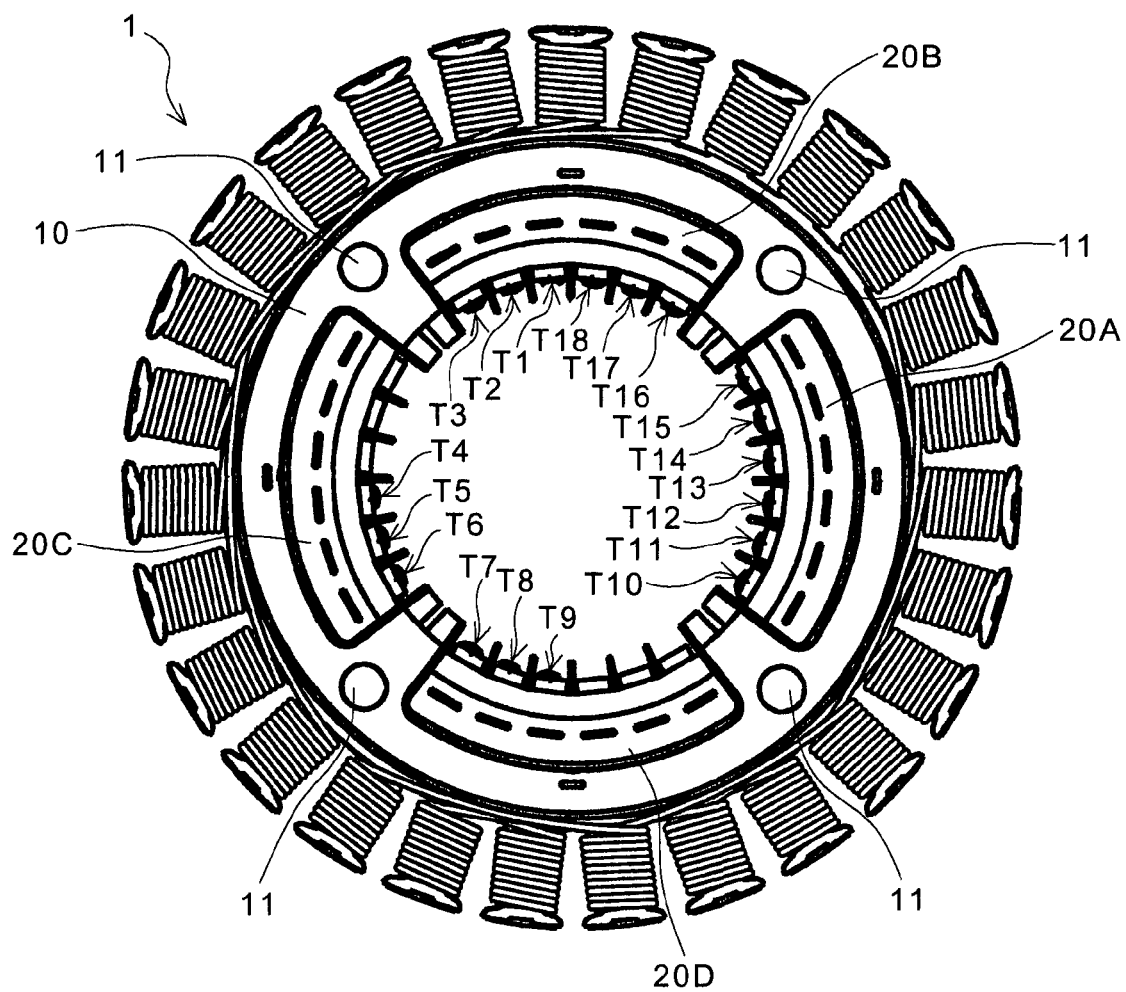
FIG. 4 is a rear view of the stator structure.

Hereinafter, preferred embodiments of the present invention will be described in detail with reference to the drawings. FIG. 1 is an elevational view of a stator structure 1 of an outer rotor generator according to an embodiment of the present invention. FIG. 2 is a development view of a stator core 10. FIGS. 3 and 4 are a side view and a rear view of the stator structure 1. The stator structure 1 is attached to a crankcase, etc., of an engine which is a driving source of the generator by four bolts passing through bolt through holes 11. At an outer peripheral side of the stator structure 1, there is arranged a cylindrical rotor yoke (not shown) having a bottom, coupled to an output shaft end of the engine and rotating. A plurality of permanent magnets for field system are attached on an inner circumferential surface of the rotor yoke. This rotor yoke and the stator structure 1 constitute the outer rotor generator.

The stator structure 1 includes a coupler 20 (20A to 20D) circumferentially divided into four and constituting an annular body as a whole. FIG. 1 illustrates the stator structure 1 whose assembly has been completed in such a manner that the coupler 20 is attached to the stator core 10, salient poles of the stator core 10 are wound by stator windings 5 via bobbins made of insulating materials such as synthetic resin, etc., and then each end (outlet) of the stator windings 5 having been wound on the salient poles is connected to a predetermined position of the coupler 20, thereby establishing terminals T1 to T18.

In the stator structure 1, main windings having been wound on 27 pieces of salient poles of the stator core 10 respectively make a set of three phases (U, V, W), and eight sets in total are arranged. Among the eight units of main windings, the stator windings 5 which start winding at salient poles U1, V1, W1 are configured to finish winding at salient poles U4, V4, W4, respectively, and the stator windings 5 which start winding at salient poles U5, V5, W5 are configured to finish winding at salient poles U8, V8, W8, respectively. It is noted that output of the three phases of the main windings is supplied to an electric power load after a tailored conversion process such as being converted into alternating current at a predetermined frequency by an inverter circuit (not shown), etc.

Three kinds of accessory windings are wound between the salient poles W8 and U1. A salient pole CHG is wound with a CHG winding whose output is used as an ignition power source of an ignition unit (not shown). A salient pole SUB is wound with a SUB winding whose output is used as a power source for a throttle motor or inverter (not shown). Further, a salient pole DC is wound with a DC winding whose output is rectified into a direct current by a rectifying circuit. The rectified direct current is used for lighting of an LED, etc.

Hereinafter, assembly procedures of the stator structure 1 will be described with reference to each drawing.

Figure 5:
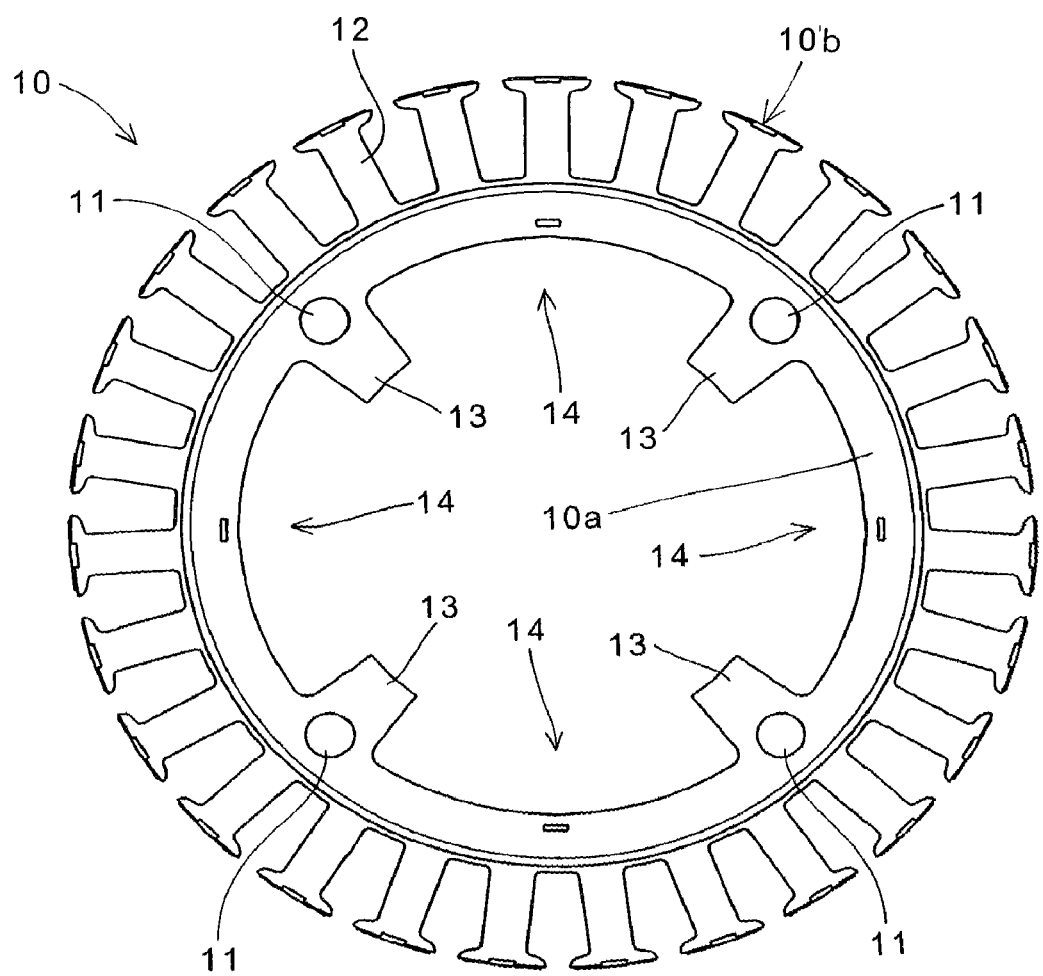
FIG. 5 is an elevational view of the stator core attached with bobbins.

FIG. 5 is an elevational view of the stator core 10 attached with bobbins 12. The stator core 10 is composed of an annular base 10a and 27 pieces of salient poles 10b protruding radially from the base 10a. The stator core 10 is formed by punching-molding a core plate from a thin plate of silicon steel and overlaying a plurality of the plates. It is noted that four coupler attaching portions 13 extending inward in the radial direction of the base 10a and bolt through holes 11 are molded at the same time as punching-molding the core plate. The bobbins 12 insulating between the stator core 10 and the stator windings 5 are formed of synthetic resin, etc., so as to cover the salient poles 10b. The bobbin 12 can be formed by injection molding or powder coating other than the method of engaging components halved in the lamination direction of the stator core 10 with each other so as to envelop the stator core 10.

The coupler attaching portions 13 and concave portions 14 between the coupler attaching portions 13 have a positioning function of the coupler 20 relative to the stator core 10. As a result, the coupler 20 can stably be temporarily assembled to the stator core 10 without passing fastening bolts through the bolt through holes 11. It is noted that the final joint of the coupler 20 and the stator core 10 is completed by attaching the stator structure 1 to the crankcase, etc., of the engine with the use of four fastening bolts.

Figure 6:
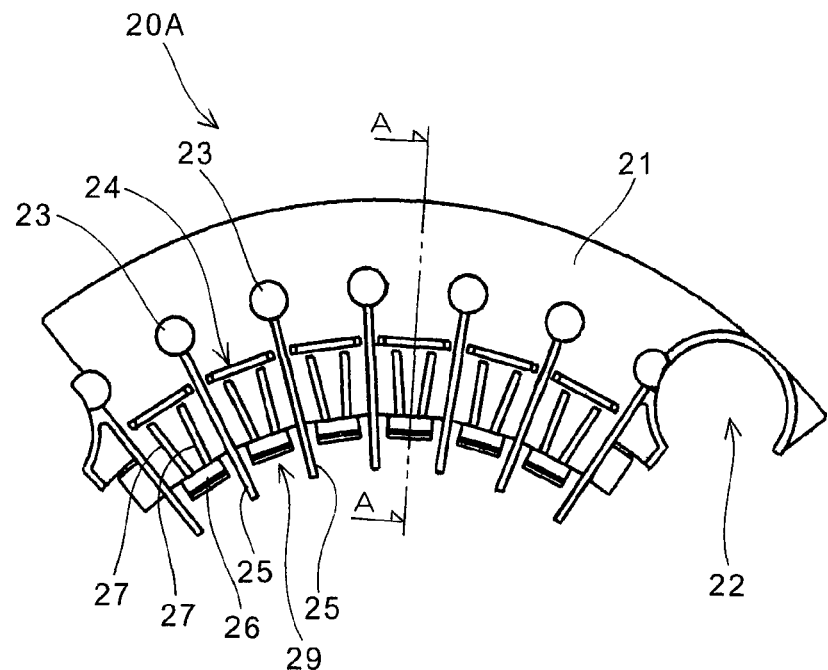
FIG. 6 is an elevational view of the coupler.
Figure 7:
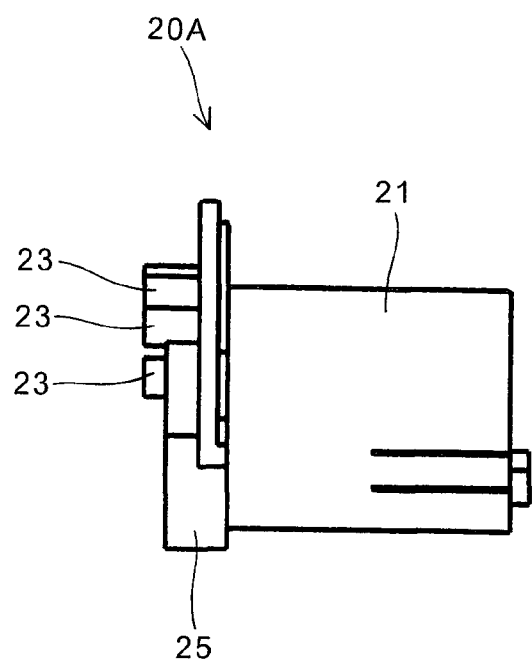
FIG. 7 is a side view of the coupler.
Figure 8:
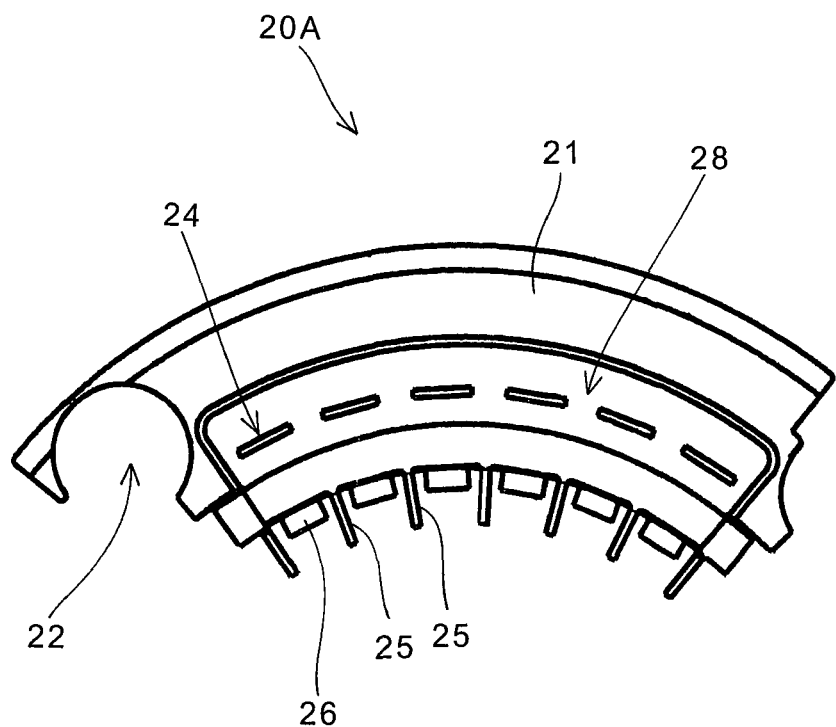
FIG. 8 is a rear view of the coupler.
Figure 12:
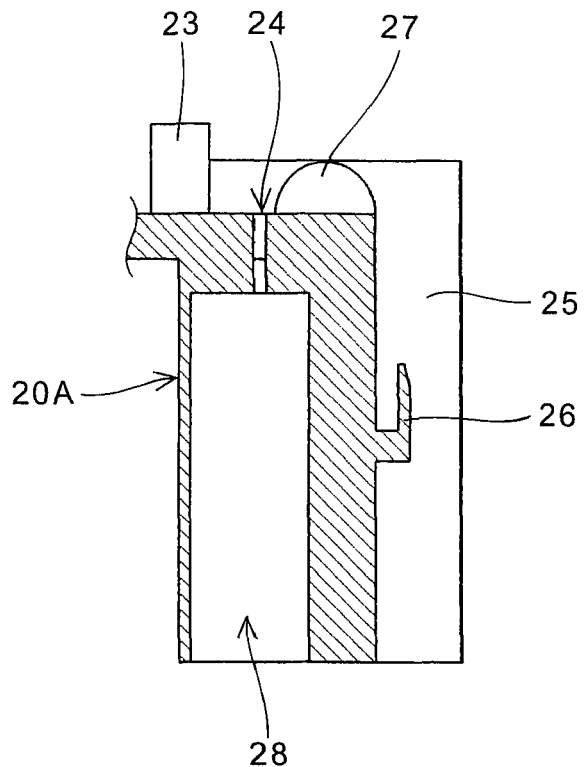
FIG. 12 is a cross sectional view taken along the line A-A in FIG. 6.

FIG. 6 is an elevational view of the coupler 20A. FIGS. 7 and 8 illustrate a side view and a rear view of the coupler 20A, respectively. Further, FIG. 12 is a cross sectional view taken along the line A-A in FIG. 6. In this embodiment, four couplers 20A, 20B, 20C and 20D shall be the same component. A main body 21 of the coupler 20A (hereinafter, sometimes simply referred to as the coupler 20) is an integrated molded component made of insulating materials such as synthetic resin, etc. An end (right end in FIG. 6) in the circumferential direction of the main body 21 is formed with a surrounding portion 22 surrounding about three quarters of the circumference of the bolt through hole 11. The surrounding portion 22 is configured to surround substantially the whole of the bolt through hole 11 with a quarter circular-arc portion formed in an adjacent coupler (coupler 20B in this case).

A connecting terminal attaching portion 29 for attaching a connecting terminal 30 (see FIGS. 9 to 11) described below is circumferentially provided at six places side by side at the front side (surface side) of the coupler 20. The connecting terminal attaching portion 29 is composed of a slit 24 serving as a connecting terminal attaching hole which penetrates to the back side of the coupler 20, two positioning protrusions 27 for fixing an attaching position of the connecting terminal 30, a partition plate 25 partitioning adjacent connecting terminal attaching portions 29, a circular cylindrical guide protrusion 23 formed so as to be contacted with the partition plate 25 at the outside in the radial direction, and a lock portion 26 in which one end of the connecting terminal 30 is locked. The connecting terminal attaching portions 29 at six places have the same shape except that two at both ends out of seven guide protrusions 23 have different shapes overlapping with the surrounding portion 22.

The lock portion 26 is configured by erecting, from an inner wall surface in the radial direction of the coupler 20, a hook-shaped member directed to the surface side of the coupler 20. Further, the positioning protrusion 27 is a substantially semicircular plate member in side view. The rear side (back side) of the coupler 20 is formed with a circular-arc concave portion 28 to which an end of the connecting terminal 30 having passed through the slit 24 protrudes.

Figure 9:
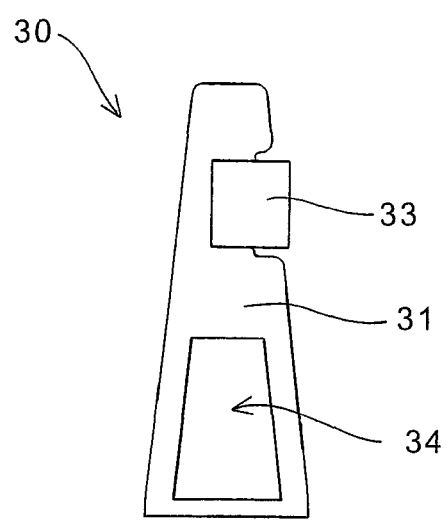
FIG. 9 is a front view of the connecting terminal.
Figure 1:
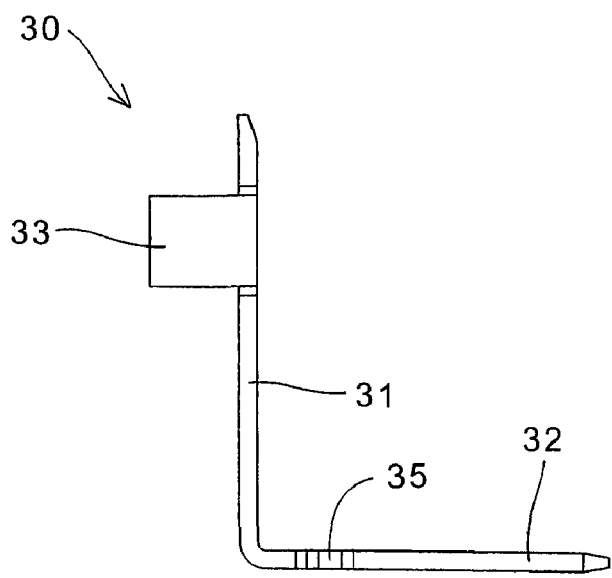
Figure 1:
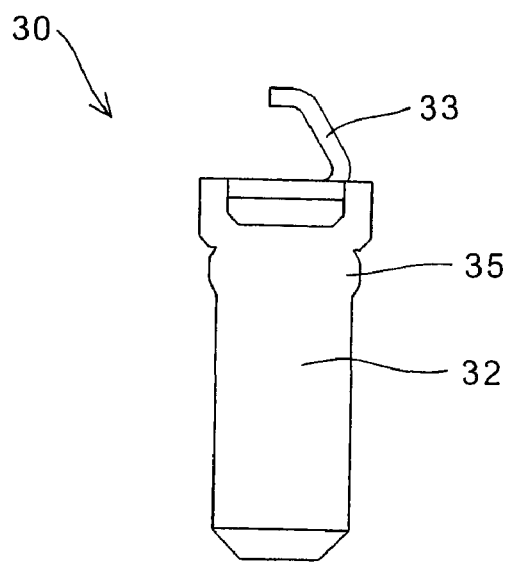

FIGS. 9 to 11 are a front view, a side view and a bottom view of the connecting terminal 30, respectively. The connecting terminal 30 attached to the connecting terminal attaching portion 29 of the coupler 20 as described above is configured in such a manner that a metal plate member having been punching-molded is bent in substantially the middle. The connecting terminal 30 has a first portion 31 formed with a pressing portion 33 for welding the end of the stator winding 5 by fusing processing and a through hole 34 with which the aforementioned positioning protrusion 27 (see FIG. 6 and FIG. 12) is engaged.

The pressing portion 33 has a structure of erecting a hook-shaped member at the surface side of the first portion 31 in order that the stator winding 5 is easily put between the first portion 31 and the pressing portion 33. Further, a second portion 32 that is bent at a right angle approximately relative to the first portion 31 is formed with an engaging protrusion 35 engaging with an inner wall portion of the slit 24 thereby fixing the connecting terminal 30 stably when the second portion 32 is inserted into the slit 24. Further, the second portion 32 has a distal end molded into a wedge shape so as to make suitable for connection with a connecter described later.

Figure 13:
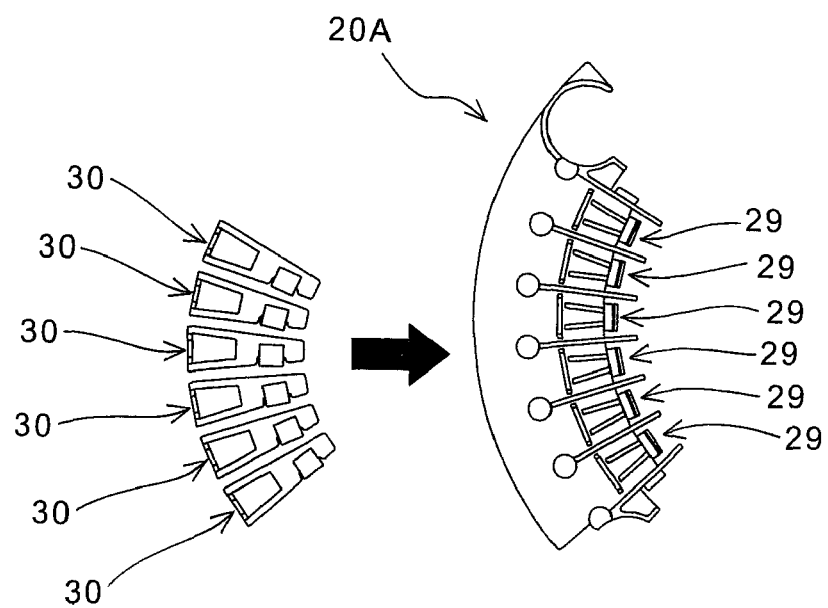
FIG. 13 is an explanatory diagram showing steps of connecting the connecting terminal with the coupler.

Hereinafter, assembly steps until the coupler 20 is attached to the stator core 10 and the end (outlet) of the stator winding 5 is engaged with the pressing portion 33 of the connecting terminal 30 will be described with reference to FIGS. 13 to 17. First, as shown in FIG. 13, six connecting terminals 30 are attached to six connecting terminal attaching portions of the coupler 20, respectively. This operation is completed by inserting and pushing the second portions 32 of the connecting terminals 30 into the slits 24.

Figure 14:
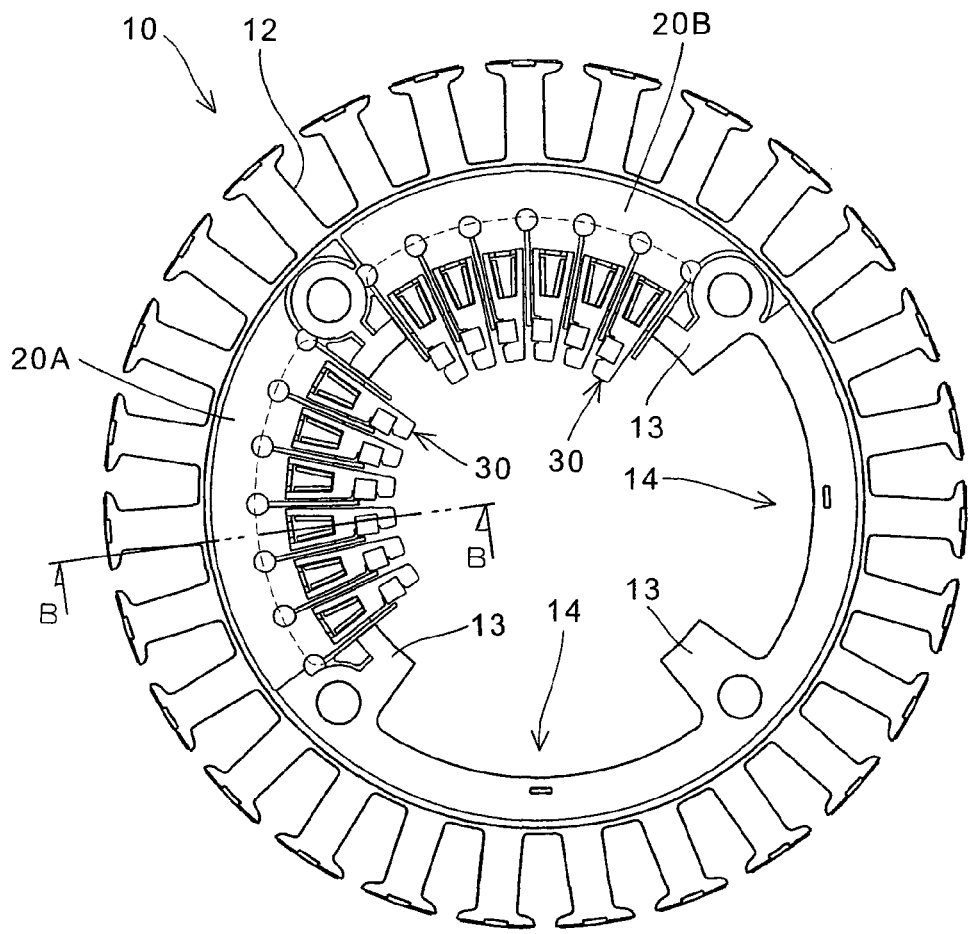
FIG. 14 is an explanatory diagram showing a state where the coupler is connected to the stator core.
Figure 15:
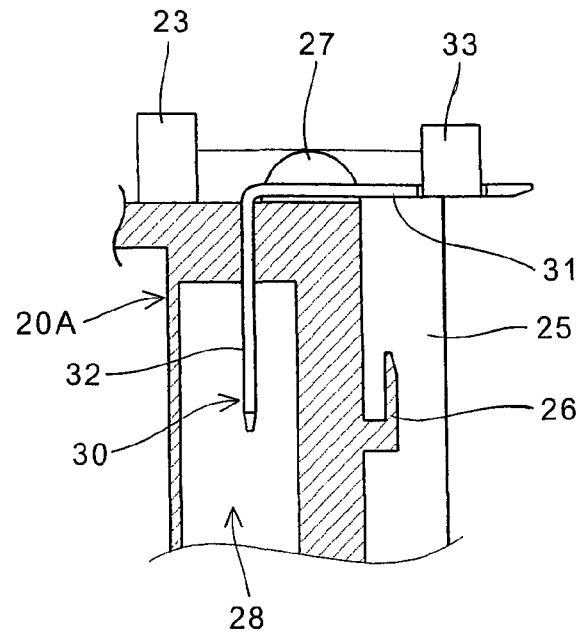
FIG. 15 is a cross sectional view taken along the line B-B in FIG. 14.

Subsequently, as shown in FIG. 14, the coupler 20 is attached to the stator core 10. Although this figure shows that only the couplers 20A and 20B are attached, the couplers 20C and 20D are also attached sequentially. It is noted that, as shown in FIG. 15 (a cross sectional view taken along the line B-B in FIG. 14), the two positioning protrusions 27 are engaged with the through hole 34 of the first portion 31 as soon as the second portion 32 of the connecting terminal 30 is entirely inserted into the slit 24 after the second portion 32 is inserted and pushed into the slit 24, whereupon positioning of the connecting terminal 30 is completed.

Figure 16:
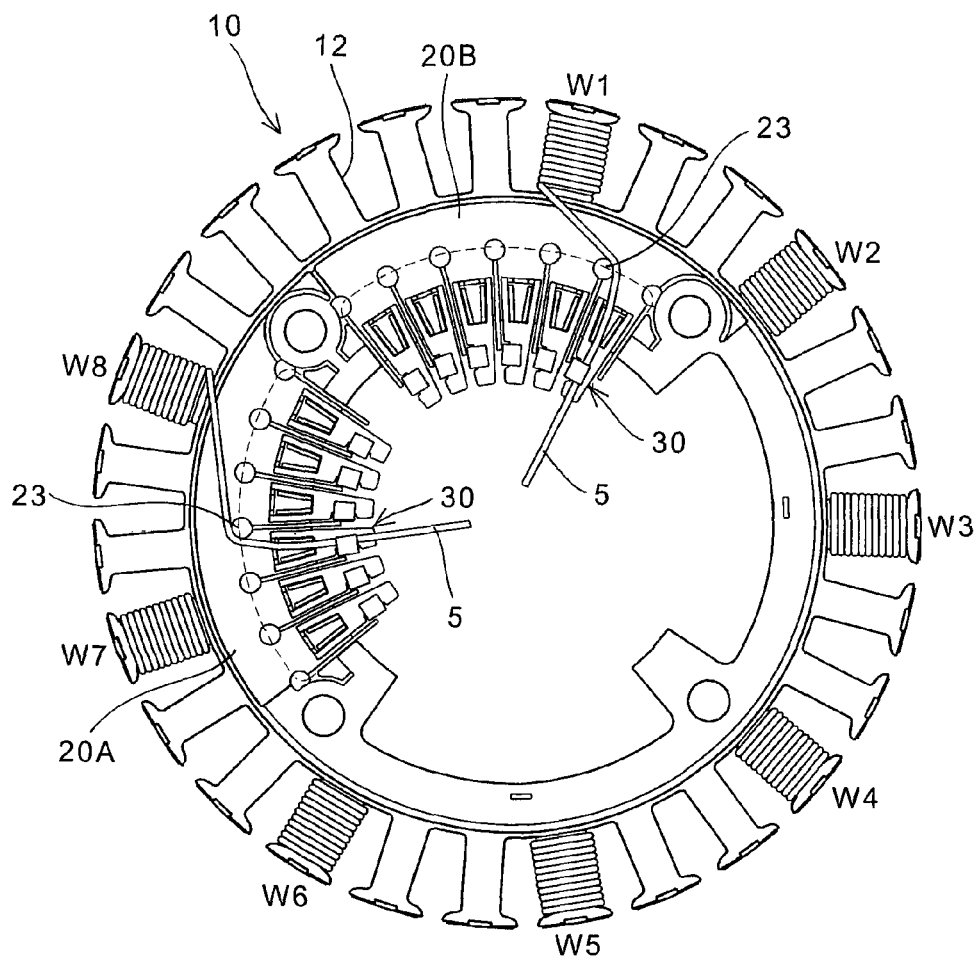
FIG. 16 is an explanatory diagram showing a state where the end of the stator winding is engaged with the connecting terminal.
Figure 17:
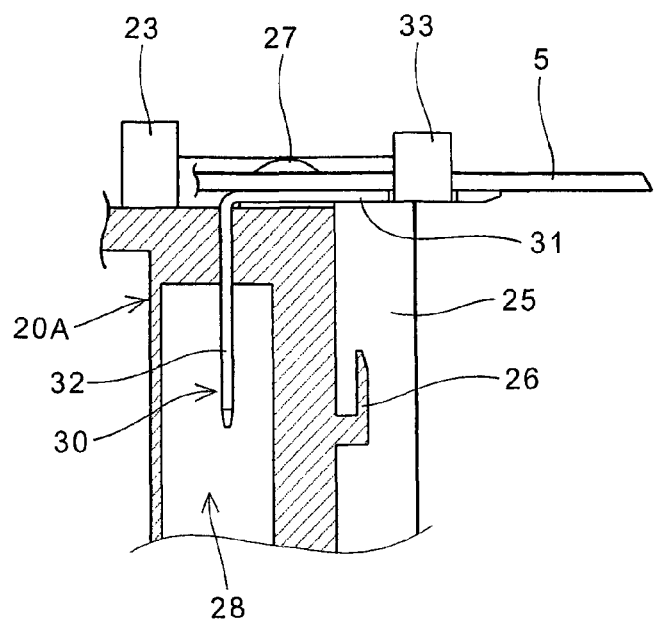
FIG. 17 is a cross sectional view illustrating a state where the end of the stator winding is engaged with the connecting terminal.

FIGS. 16 and 17 illustrate a state where the end of the stator winding 5 having finished winding the salient pole W8 is engaged with a predetermined connecting terminal 30 (corresponding to the terminal T12 shown in FIG. 1) of the coupler 20A and then the end of the stator winding 5 having finished winding the salient pole W1 is engaged with a predetermined connecting terminal 30 (corresponding to the terminal T3 shown in FIG. 1) of the coupler 20B. It is noted that illustration of winding ends of the salient poles W4 and W5 is omitted in these figures.

In this embodiment, the stator winding 5 extending from each salient pole is configured to be bent due to being guided by the guide protrusion 23 and then reach the connecting terminal 30. At that moment, since the guide protrusion 23 is formed into a circular cylinder, the bent portion of the stator winding 5 cannot be bent more than a curvature of the outer circumferential surface of the guide protrusion 23. As a result, bending stress caused on the bent portion can significantly be reduced even when tension is applied to the end of the stator winding 5. It is noted that which connecting terminal 30 the end of the stator winding 5 extending from each salient pole is to be connected with can be determined arbitrarily depending on a circuit configuration of the stator structure 1.

Further, the winding end that extends from each salient pole is bent at the outer circumferential surface of the guide protrusion 23 and then passes between the two positioning protrusions 27 (see FIG. 20) and is guided to the pressing portion 33. The two positioning protrusions 27 are arranged in such a manner that their facing interval becomes narrow toward the inside in the radial direction, and accordingly an arranging position of the winding end is easily fixed, and the operation of guiding the winding end to the pressing portion 33 is further facilitated.

Figure 18:
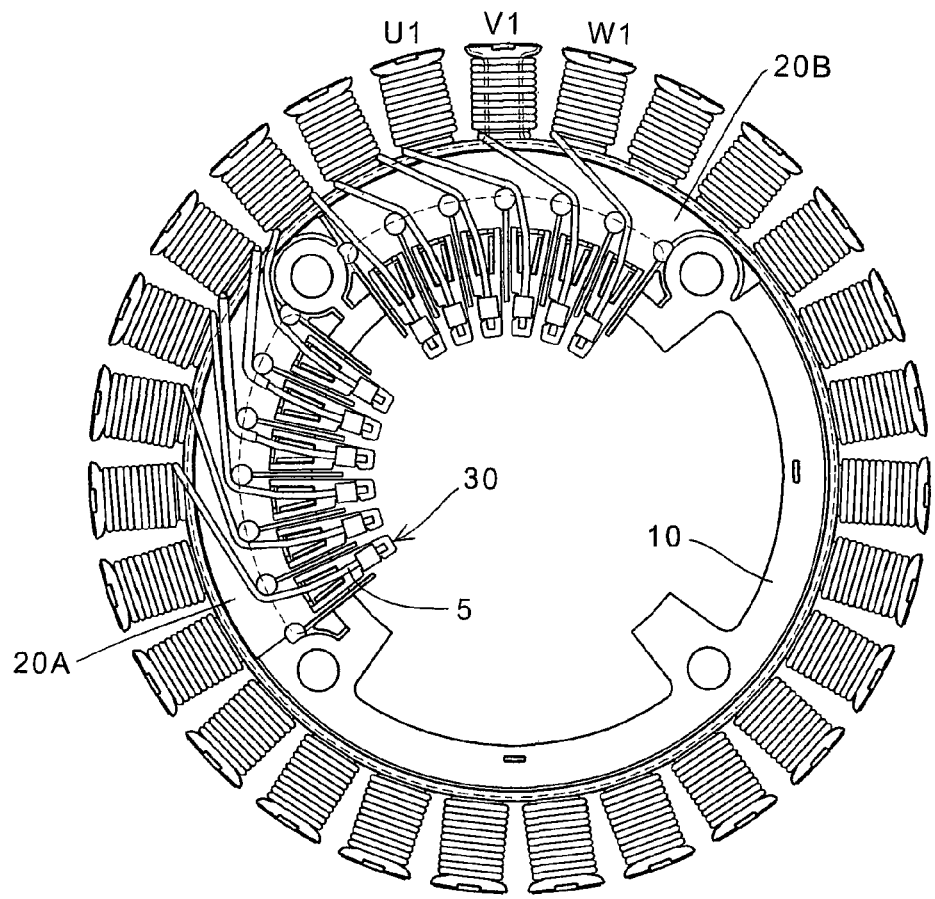
FIG. 18 is an explanatory diagram showing a state of finish of cutting the stator winding in two couplers.

FIG. 18 illustrates a state up to a step of cutting an excess end of the stator winding 5 after the fusing processing of the connecting terminal 30 is completed in the couplers 20A and 20B. Hereinafter, a flow from the fusing processing to the cutting processing will be described with reference to FIGS. 19 to 22.

Figure 19:
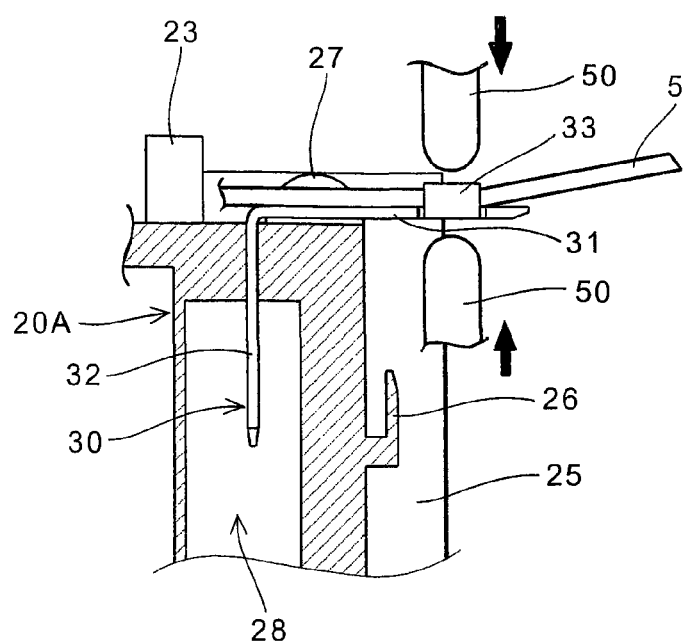
FIG. 19 is an explanatory diagram showing a step of the fusing processing.

FIG. 19 is an explanatory diagram showing a step of the fusing processing. The same reference numerals as above denote the same or equivalent components. In this embodiment, the pressing portion 33 of the connecting terminal 30 is configured to protrude inward in the radial direction of the coupler 20 with the connecting terminal 30 attached to the coupler 20. A pair of upper and lower fusing electrodes 50 sandwich the pressing portion 33 from above and below and apply electric power and pressure, thereby deforming the pressing portion 33 and pressure-welding the stator winding 5 by fusing processing (thermal caulking).

At that moment, since the pressing portion 33 of the connecting terminal 30 protrudes inward in the radial direction of the coupler 20, the coupler 20 formed of resin, etc., can be prevented from being deformed by heat during the fusing processing. Further, there exists nothing in the vertical direction of the pressing portion 33 as shown that constitutes an obstacle to movements of the fusing electrodes. Accordingly, automation of the fusing processing is facilitated.

Figure 20:
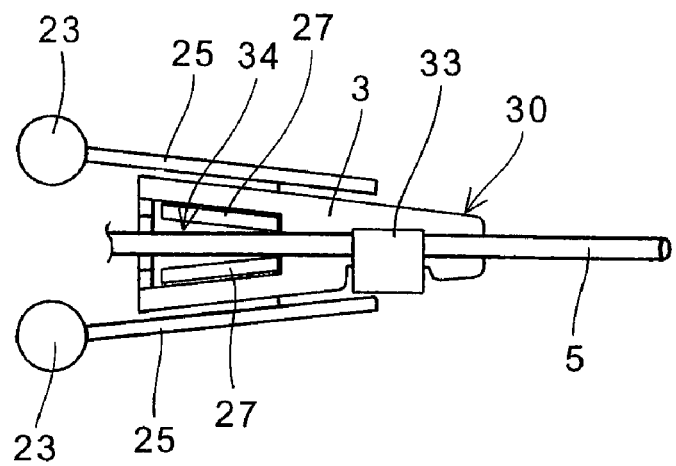
FIG. 20 is a top view of the connecting terminal showing a state before the fusing processing.
Figure 21:
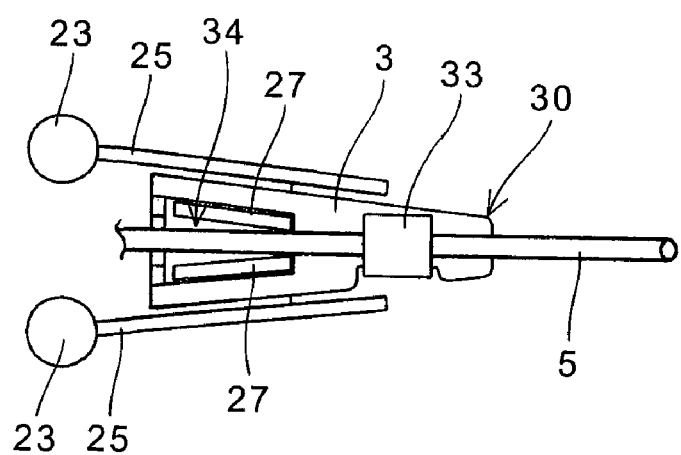
FIG. 21 is a top view of the connecting terminal showing a state after the fusing processing.
Figure 22:
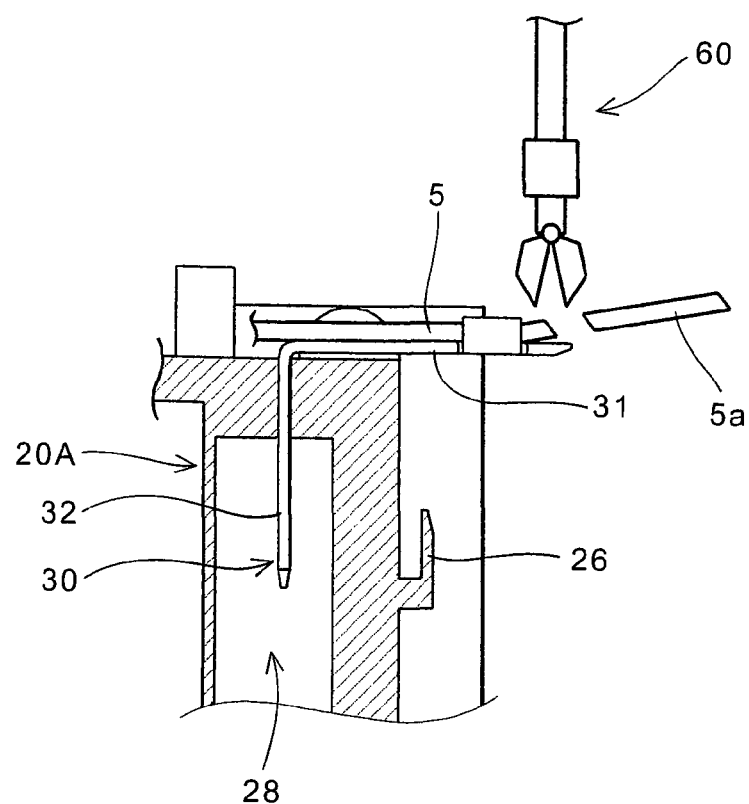
FIG. 22 is an explanatory diagram showing a step of cutting an excess end of the stator winding.

FIGS. 20 and 21 are top views of the connecting terminal 30 showing a state before and after the fusing processing. As shown in FIG. 21, the pressing portion 33 is deformed by the fusing processing in such a manner as covering a top portion of the stator winding 5. On the other hand, the end of the stator winding 5 is deformed in such a manner as rising reversely due to the pressing portion 33 having been pressed downward as shown (see FIG. 19). As a result, the operation of cutting the excess end 5a with a cutter 60 as shown in FIG. 22 is further facilitated.

Figure 23:
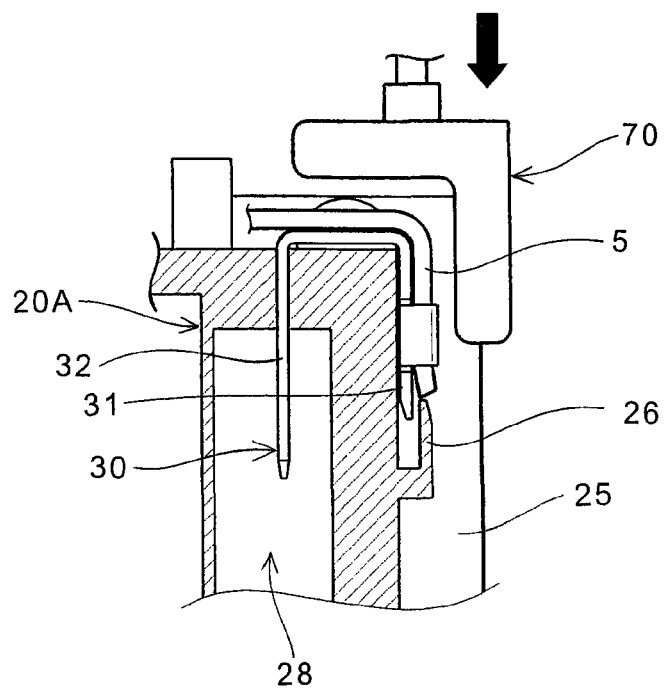
FIG. 23 is an explanatory diagram showing a step of bending the connecting terminal after the fusing processing.

FIG. 23 is an explanatory diagram showing a step of bending one end of the connecting terminal 30 after the fusing processing. As soon as the aforementioned cutting processing of the excess end 5a is completed, a step of bending the first portion 31 of the connecting terminal 30 along a side wall of the coupler 20A is performed, whereupon the assembly of the stator structure 1 is completed. This bending step is carried out by means that one end of the connecting terminal 30 is pushed downward as shown with a bending machine 70. It is noted that a driving direction of the bending machine 70, that is, the rotation axis direction of the generator, and a driving direction of the fusing electrodes 50 (see FIG. 19) become the same in this embodiment. Consequently, successive automatic processing from the fusing processing to the bending processing is facilitated without changing the direction of the stator structure 1.

Further, the first portion 31 of the connecting terminal 30 is bent while the stator winding 5 is arranged at the outside peak of the bent portion. At that moment, the connecting terminal 30 has a certain thickness, and thus, a distance between the salient pole and the pressing portion 33 becomes slightly longer in conjunction with the bending processing. As a result, slack in the stator winding 5 between the salient pole and the pressing portion 33 is removed if any, and resistance to vibrations at the pressing portion 33 is enhanced. Further, the distal end of the first portion 31 is locked in the lock portion 26 in conjunction with this bending processing. Consequently, movements of the first portion 31 are restrained and resistance to vibrations is further improved.

Moreover, the entire connecting terminal 30 comes to be stored within a space surrounded by the partition plates 25 in conjunction with the aforementioned bending processing. As a result, the connecting terminal 30 does not protrude either toward the surface side of the coupler 20 or inward in the radial direction of the coupler 20, so that workability when the completed stator structure 1 (see FIG. 1) is attached to the crankcase is improved. It is noted that a corner of the coupler 20 contacting with the inside valley of the bent portion of the connecting terminal 30 may be of a rounded shape for making the bending processing easier.

Figure 24:
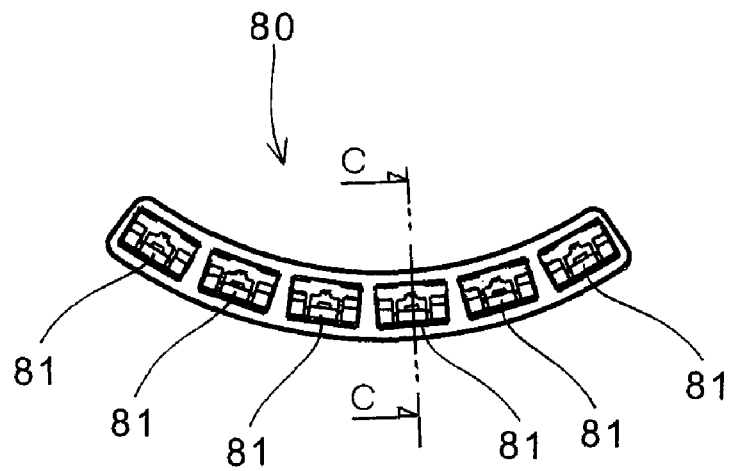
FIG. 24 is an elevational view of a connector.
Figure 25:
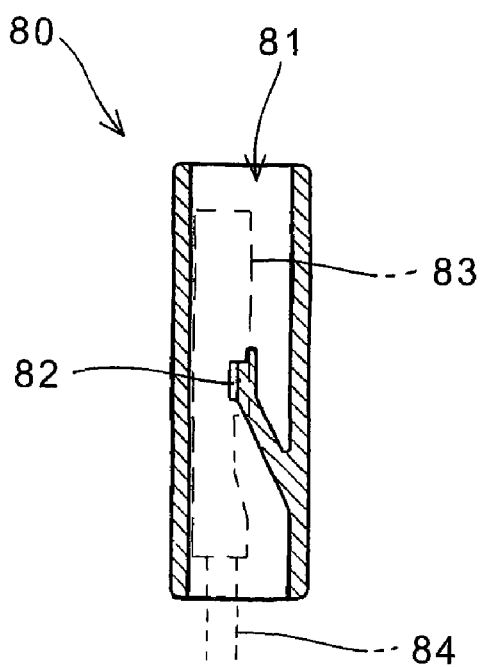
FIG. 25 is a cross sectional view taken along the line C-C in FIG. 24.

FIG. 24 is an elevational view of a connector 80 attached to the concave portion 28 of the coupler 20. FIG. 25 is a cross sectional view taken along the line C-C in FIG. 24. The connector 80 of a circular arc shape is such a component that is attached to the completed stator structure 1 and connects the second portion 32 protruding from the concave portion 28 of the coupler 20 (see FIG. 8 and FIG. 23) to an external wiring 84. The connector 80 is provided with six engaging holes 81 into which the second portion 32 of the connecting terminal 30 is inserted. The engaging hole 81 has an interior in which a socket 83 connected to an end of the external wiring 84 is held by a locking protrusion 82. As a result, fitting of the connector 80 to the concave portion 28 of the coupler 20 electrically connects each stator winding with the external wiring.

According to the stator structure 1 of the present invention, as described above, the pressing portion 33 is configured to protrude inward in the radial direction of the coupler 20 when the connecting terminal 30 is attached to the coupler 20, so that the fusing electrodes 50 and the coupler 20 cannot come in contact with each other at the time of fusing processing and the disadvantage of deformation of the coupler 20 due to application of electric power and pressure is decreased. Further, the end of the stator winding 5 drawn from the salient pole side of the stator core 10 is configured to be guided at the outer circumferential surface of the guide protrusion 23 provided on the coupler 20, bent inward in the radial direction and reach the pressing portion 33. Accordingly, bending stress caused on the bent portion can significantly be reduced even when tension is applied to the stator winding 5.

Furthermore, the first portion 31 of the connecting terminal 30 on which the pressing portion 33 is provided is bent after the fusing processing at a substantial right angle toward a side opposed to a side with which the stator winding 5 is connected, and then the distal end thereof is locked in the lock portion 26 provided on the inner side wall in the radial direction of the coupler 20. Accordingly, slack in the stator winding 5 is removed and the movements of the connecting terminal 30 are restrained as well, thereby significantly improving resistance to vibrations at the pressing portion 33.

It is noted that shapes such as stator core, coupler, connecting terminal, etc., circuit configurations of the stator winding and winding methods are not restricted to the above embodiments and can be modified in various ways. For example, the coupler can be an annular integrated molded component and a cross sectional shape of the guide protrusion provided on the coupler can be of a fan shape such that only a contact portion with the winding becomes a curved surface.

Further, the stator structure as described in the foregoing embodiments is such that the stator core and the coupler are separated bodies. Therefore, for example, a configuration that system output (for both 50/60 Hz) when they are installed in an inverter generator is made 100V, 120V, 220V, 230V, 240V, etc., at a single voltage mode or 100/200V, 115/230V, 120/240V, etc., at a dual voltage mode can be obtained only by changing the stator core and the winding method of the winding. Moreover, the terminal structure of the stator structure according to the present invention is adaptable to not only an inverter generator but also a cycloconverter generator and a DC output generator (welding generator).

REFERENCE SIGNS LIST

1: stator structure,
5: stator windings,
10: stator core,
10a: base,
10b: salient pole,
11: bolt through hole,
20 (20A-20D): coupler,
23: guide protrusion,
24: slit (connecting terminal attaching hole),
25: partition plate,
26: lock portion,
27: positioning protrusion,
28: concave portion,
29: connecting terminal attaching portion,
30: connecting terminal,
31: first portion,
32: second portion,
33: pressing portion,
34: through hole,
35: engaging protrusion,
50: fusing electrode,
60: cutter,
70: bending machine,
80: connector,
T1-T18: terminals.

The invention claimed is:

1. A stator structure of an outer rotor multipolar generator including an annular stator core arranged with a salient pole at an outer circumference thereof and a winding by which the salient pole is wound via an insulating bobbin, the stator structure comprising:
    an annular coupler fixed at an inner circumference side of the stator core; and
    a connecting terminal for connecting the winding to an external wiring, wherein
    the annular coupler has an attaching portion for the connecting terminal and a guide protrusion adjoining an outer circumference side of the coupler relative to the attaching portion and guiding the winding to the connecting terminal;
    the connecting terminal has a pressing portion for connecting the winding to the connecting terminal by fusing processing;
    the connecting terminal is fixed at the attaching portion in such a manner that the pressing portion protrudes inward in a radial direction of the annular coupler; and
    an end of the winding drawn from the salient pole is configured to be guided at an outer circumferential surface of the guide protrusion, bent inward in the radial direction and then reach the pressing portion.

2. The stator structure of the outer rotor multipolar generator according to claim 1, wherein
    one end of the connecting terminal formed with the pressing portion is configured to be bent, after the fusing processing, at a right angle approximately toward a side opposed to a side with which the winding is connected.

3. The stator structure of the outer rotor multipolar generator according to either claim 1 or 2, wherein
    the connecting terminal is a plate member composed of a first portion and a second portion, the first portion being configured to be provided with the pressing portion and the second portion being bent at a right angle approximately relative to the first portion;
    the first portion has a through hole for positioning at the time of attachment to the attaching portion of the annular coupler; and
    the annular coupler has a positioning protrusion engaged with the through hole of the first portion and a connecting terminal attaching hole into which the second portion is inserted.

4. The stator structure of the outer rotor multipolar generator according to either claim 1 or 2, wherein
    the annular coupler is composed of a plurality of components circumferentially divided, and each component has the same shape.

5. The stator structure of the outer rotor multipolar generator according to claim 2, wherein
    the annular coupler has a lock portion on which a distal end of the one end of the connecting terminal is locked when the one end is bent after the fusing processing.

* * * * *